United States Patent
Dhandu et al.

(10) Patent No.: US 9,756,462 B2
(45) Date of Patent: Sep. 5, 2017

(54) DEVICE STATE DERIVATION

(71) Applicant: VERIZON PATENT AND LICENSING INC., Arlington, VA (US)

(72) Inventors: Siva Sandeep Dhandu, Princeton, NJ (US); Andrew E. Youtz, Princeton, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 14/481,679

(22) Filed: Sep. 9, 2014

(65) Prior Publication Data

US 2016/0073300 A1    Mar. 10, 2016

(51) Int. Cl.
    *H04W 36/00*      (2009.01)
    *H04W 4/02*      (2009.01)
    *H04W 36/14*      (2009.01)
    *H04W 48/16*      (2009.01)
    *H04W 48/18*      (2009.01)
    *H04W 88/06*      (2009.01)

(52) U.S. Cl.
CPC ........ *H04W 4/021* (2013.01); *H04W 36/0088* (2013.01); *H04W 36/14* (2013.01); *H04W 48/16* (2013.01); *H04W 48/18* (2013.01); *H04W 88/06* (2013.01)

(58) Field of Classification Search
CPC ................................................. H04W 36/0033
USPC ........................................................ 370/331
See application file for complete search history.

(56) References Cited

U.S. PATENT DOCUMENTS

| | | | | |
|---|---|---|---|---|
| 9,480,102 | B2* | 10/2016 | Su | H04W 76/048 |
| 2010/0197223 | A1* | 8/2010 | Saito | H04B 7/15507 |
| | | | | 455/23 |
| 2011/0021158 | A1* | 1/2011 | Xing | H04W 36/30 |
| | | | | 455/68 |
| 2012/0214480 | A1* | 8/2012 | Ionescu | H04W 4/001 |
| | | | | 455/425 |
| 2012/0258715 | A1* | 10/2012 | Souissi | H04W 36/14 |
| | | | | 455/436 |
| 2014/0098786 | A1* | 4/2014 | Yim | H04W 36/0011 |
| | | | | 370/331 |
| 2014/0112252 | A1* | 4/2014 | Hoymann | H04L 5/0053 |
| | | | | 370/328 |

(Continued)

FOREIGN PATENT DOCUMENTS

GB      2404821 A     *    6/2003

*Primary Examiner* — Mang Yeung
*Assistant Examiner* — Peter G Solinsky (57) ABSTRACT

Systems and methods for device state derivation are described. Some implementations include receiving, from a mobile station at a state derivation server, current connectivity characteristics of one or more radio access technologies (RATs) that are serviced by a modem of the mobile station, analyzing the one or more connectivity characteristics to determine one or more of: whether the mobile station is tuning away from a particular RAT to access another RAT or a duration for which the mobile station is tuning away from the particular RAT to access the other RAT, based on the analyzing, determining a current connectivity state of the mobile station, and displaying the current connectivity state at a user interface of a computing device associated with the state derivation server.

20 Claims, 4 Drawing Sheets

(56) References Cited

U.S. PATENT DOCUMENTS

| | | | |
|---|---|---|---|
| 2014/0204802 A1* | 7/2014 | Han | H04W 48/16 |
| | | | 370/255 |
| 2014/0273911 A1* | 9/2014 | Dunn | H04W 4/22 |
| | | | 455/404.1 |
| 2015/0189556 A1* | 7/2015 | Sidhu | H04W 36/0083 |
| | | | 455/436 |
| 2015/0358853 A1* | 12/2015 | Kiss | H04W 28/0268 |
| | | | 370/230 |
| 2016/0014613 A1* | 1/2016 | Ponnampalam | H04W 16/18 |
| | | | 370/254 |

* cited by examiner

DEVICE STATE DERIVATION

BACKGROUND

Mobile stations, such as smartphones, can include support for multiple radio access technologies. Examples of these radio access technologies include Code Division Multiple Access (CDMA), Global System for Mobile Communication (GSM), Universal Mobile Telecommunications System (UMTS) and Long Term Evolution (LTE). Many wireless networks have been initially built using legacy 2G (e.g., GSM or CDMA) or 3G (e.g., Wideband CDMA, Enhanced Voice-Data Optimized (EV-DO)) technologies and have later been enhanced with 4G technologies to provide improved service capabilities and data rates to customers.

Deploying new radio access technologies on existing legacy wireless networks can take a significant amount of time and planning. This is because there are many variables including geographic area, location of cell sites, transmission frequency used, construction permits, operating agreements and fees, etc. that can affect deployment. Devices that operate on such enhanced legacy networks often have to include support for multiple access technologies while providing coverage (or footprint) so that coverage of a newer network fully overlaps coverage of a legacy network. For example, 4G devices may support packet switched Voice over Internet Protocol (VoIP) type voice operation over a 4G network and also circuit switched voice over 3G or 2G networks. Some networks and devices support voice call continuity across packet switched 4G networks and circuit switched 3G/2G networks, and there may be fewer concerns about not having a full overlay of the 4G network to match the legacy 3G/2G network. For example, in networks that do not support voice call continuity, having a complete overlay becomes an important factor in determining a time frame to launch an enhanced VoIP service such as VoLTE (VoIP over LTE). Thus, validating coverage of different networks in a geographic region is necessary. Furthermore, when multiple technology networks are logically overlayed on top of each other, their respective coverage or service availability may not always be completely identical. Therefore, multiple mechanisms are used to balance the traffic in between the different technologies (e.g., circuit switch fall back, hybrid mode support between LTE and CDMA). Analyzing multimode operation and validating each technology's availability/coverage is a key performance evaluation in such a multi-technology network.

One approach to determine availability of multiple technology networks is to move or drive test equipment through a target market (such as a city or any region). This approach can be time consuming and logistically challenging. While device original equipment manufacturers (OEMs) may use a chipset vendor's Application Programming Interface (API) to access certain features on the device, internal operational or connectivity states of a device may not be made available to OEMs or wireless network providers to, for example, validate network coverage. This makes collecting and analyzing such data difficult.

As the foregoing illustrates, a new approach for device state derivation may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to device state derivation. A general exemplary operation includes receiving, from a mobile station at a state derivation server, current connectivity characteristics of one or more radio access technologies (RATs) that are serviced by a modem of the mobile station. The one or more connectivity characteristics can be analyzed to determine, for example, whether the mobile station is tuning away from a particular RAT (e.g., an enhanced RAT such as LTE) to access another RAT (e.g., a pre-existing legacy RAT such as CDMA) or a duration for which the mobile station is tuning away from the particular RAT to access the other RAT. Based on the analyzing, a current connectivity state of the mobile station can be determined and displayed at a user interface of a computing device associated with the state derivation server. Furthermore, the determined connectivity state may be used to -effect network changes, for example, certain geographical regions may be switched to provide service based on legacy wireless technology (e.g. CDMA) and then back to an enhanced wireless service (e.g. LTE). Furthermore, parameters associated with wireless data usage and network connectivity (e.g., data throughput before or after tune away) may be stored over time or recorded at a server or cloud-based database. The parameters may be retrieved at any time for further analysis, classification and optimization of wireless networks serviced by a wireless network provider (for example, compare performance of devices that maintain different states).

In this way, the disclosed implementations can automatically derive an internal connectivity or operation state of a mobile station based on current connectivity characteristics of the mobile station. The disclosed implementations are advantageous because they may not need access to APIs that may be specific to modem or other device hardware of the mobile station. Furthermore, the disclosed implementations do not need movement of test equipment through a target market (such as a city or any region) to validate service availability. As a non-limiting example, internal operational states of a device can be remotely and automatically derived to validate network coverage. This makes collecting and analyzing such data convenient for wireless network providers. Thus, wireless network providers are able to efficiently and effectively determine a complete overlay of wireless network technologies covering a geographic area.

Reference now is made in detail to the examples illustrated in the accompanying drawings and discussed below.

Figure 1:
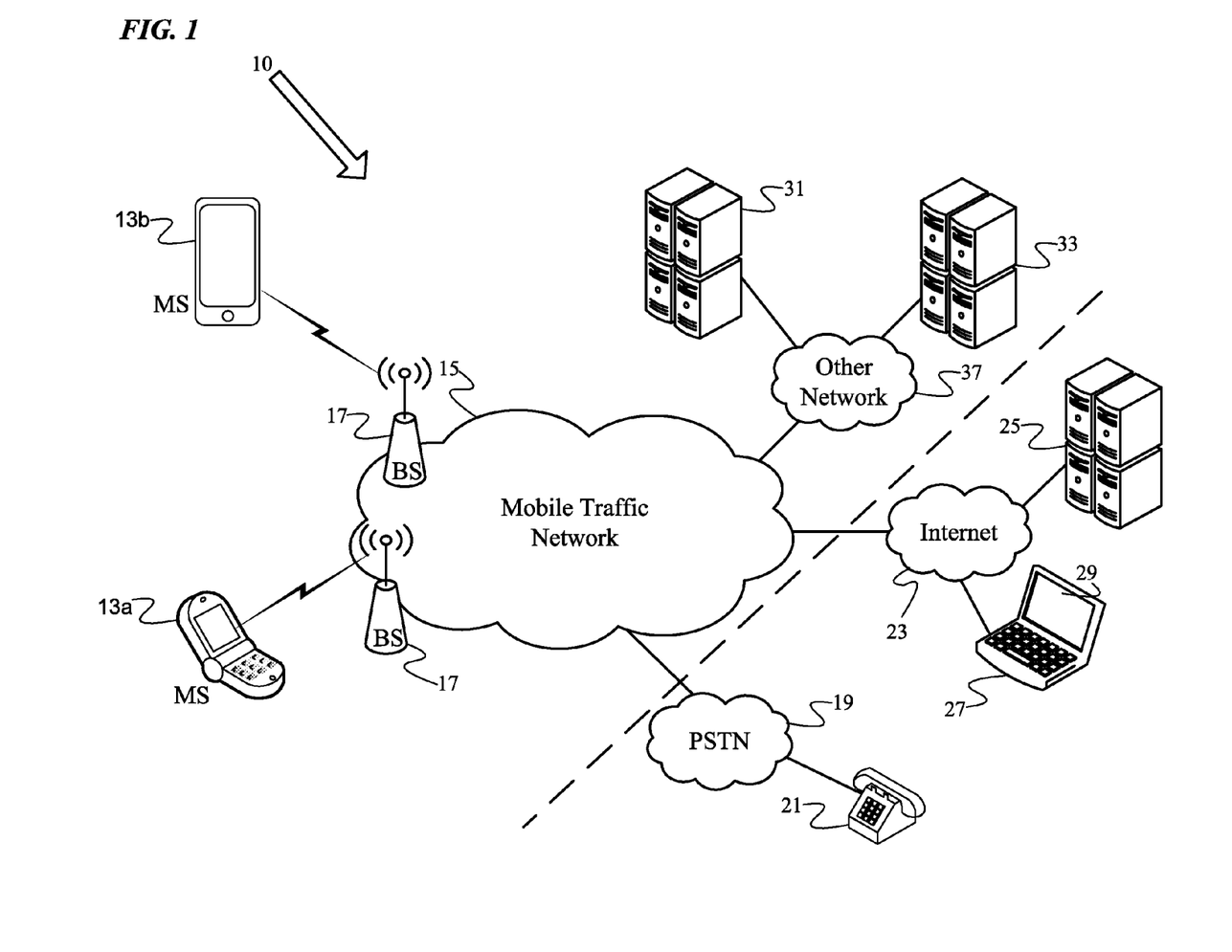
FIG. 1 is a high-level functional block diagram of an example of a system of networks/devices that provide various communications for mobile stations and support an example of the device state derivation service.

FIG. 1 illustrates a system 10 offering a variety of mobile communication services, including communications for device state derivation. The example shows simply two mobile stations (MSs) 13a and 13b as well as a mobile communication network 15. The stations 13a and 13b are examples of mobile stations that may be used for the device state derivation service. However, the network will provide similar communications for many other similar users as well as for mobile stations/users that do not participate in the device state derivation service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, LTE standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b are capable of voice telephone communications through the network 15, and for the device state derivation services, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a state derivation server 25 connected to the Internet 23; and the data services for the mobile stations 13a and 13b via the Internet 23 may be with devices like those shown at 25 and 27 as well as with a variety of other types of devices or systems capable of data communications through various interconnected networks. The mobile stations 13a and 13b also can receive and execute applications (e.g., applications related to the state derivation service) written in various programming languages.

Mobile stations 13a and 13b can take the form of portable handsets, smart-phones or personal digital assistants, although they may be implemented in other form factors. Program applications, including an application to assist in the device state derivation service and/or any an application purchased via the on-line device state derivation service can be configured to execute on many different types of mobile stations 13a and 13b. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serve mobile stations 13a and 13b, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13a and 13b, when the mobile stations are within range. Each base station can include a BTS coupled to several antennae mounted on a radio tower within a coverage area often referred to as a "cell." The BTS is the part of the radio network that sends and receives RF signals to/from the mobile stations 13a and 13b that are served by the base station 17.

The radio access networks can also include a traffic network represented generally by the cloud at 15, which carries the user communications and data for the mobile stations 13a and 13b between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here for simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a state derivation server 25 and/or with application servers 31. If the mobile service carrier offers the device state derivation service, the service may be hosted on a carrier operated application server 31, for communication via the networks 15 and 29. Alternatively, the device state derivation service may be provided by a separate entity (alone or through agreements with the carrier), in which case, the service may be hosted on an application server such as state derivation server 25 connected for communication via the networks 15 and 23. Servers such as 25 and 31 may provide any of a variety of common application or service functions in support of or in addition to an application program running on the mobile station 13. However, for purposes of further discussion, we will focus on functions thereof in support of the mobile station state derivation service. For a given service, including the device state derivation service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10. A similar authentication function may be provided for device state derivation service(s) offered via the state derivation server 25, either by the server 33 if there is an appropriate arrangement between the carrier and the operator of server 24, by a program on the state derivation server 25 or via a separate authentication server (not shown) connected to the Internet 23.

In some implementations, one or more current connectivity characteristics of one or more radio access technologies (RATs) that are serviced by a modem of the mobile station 13a (or 13b) may be received at the state derivation server 25. The current connectivity characteristics may be received from a software application that interacts with the mobile of the mobile station 13a. The software may be installed and resident at the mobile station 13 and may communicate with the mobile station 13a's hardware (e.g., modem) using application programming interfaces (APIs) to determine a connectivity characteristics of the mobile station 13a. The software application may be previously deployed by the state derivation server 25 to the mobile station 13a at the request of an administrator of state derivation server 25. In another implementation, the software application may be pre-installed on the mobile station 13a at the time of manufacture of the mobile station 13a. In some implementations, the deployment may be automatic and based on for example an identifier associated with the mobile station 13a. The identifier may include an International Mobile Subscriber Identity (IMSI), Mobile Directory Number (MDN) or Mobile Equipment Identifier (MEID) etc.

In some implementations, the one or more connectivity characteristics received from the mobile station 13a may include which RATs were connected to by the modem of the mobile station 13a as well as times at which the RATs were connected by the modem of the mobile station 13a. For example, the connectivity characteristics may indicate that the mobile station is presently connected to an LTE RAT and the initial connection of the ongoing connection was made to the LTE RAT at 23:00 hours on Jun. 4, 2014. The characteristics may also include respective signal strengths and frequency parameters associated with the modem's connections to the RATs. The characteristics may be determined when an initial connection to a network is made by the modem, periodically or at predetermined times, or when any data is requested/sent from the mobile station 13a via the modem. In some implementations, a decision to determine the characteristics may be made by the software that is resident and installed at the mobile station 13a that is in communication with the state derivation server 25. The signal strengths may be provided in decibels or in any other measurement index. In some implementations, the connectivity characteristics may be transmitted as a file including the connectivity characteristics in a text format. This example is purely illustrative and is not intended to limit the disclosed implementations.

In some implementations, the state derivation server 25 can analyze the one or more connectivity characteristics to determine whether the mobile station is tuning away from a particular RAT to access another RAT as well as a duration for which the mobile station is tuning away from the particular RAT to access the other RAT. The term "tuning away" can refer to absence in signal strength from a particular wireless technology (e.g., CDMA or LTE), periods of intermittent connectivity to the particular wireless technology or may refer to an extended duration of being unconnected to the particular wireless technology. For example, the state derivation server 25 may review respective signal strengths and frequency parameters associated with the modem's connections to determine that the modem is tuning away from the particular RAT to access the other RAT. For example, the state derivation server 25 may determine if the modem is tuning away from an existing connection to an enhanced LTE network to a legacy CDMA network.

Figure 2:
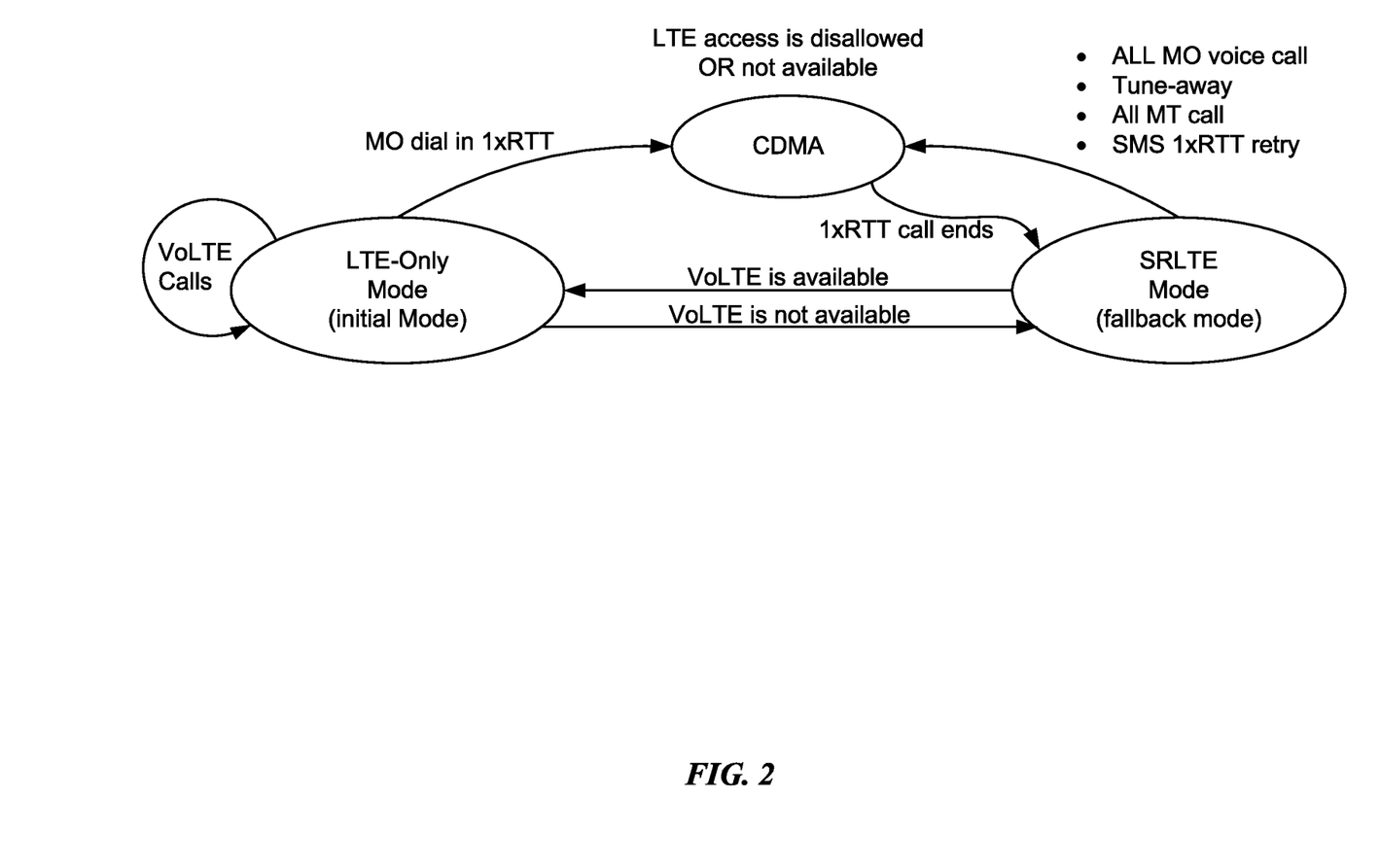
FIG. 2 is an exemplary internal device state transition diagram associated with a mobile station.

In some implementations, the state derivation server 25 can, based on the analyzing, determine a current connectivity state of the mobile station 13a. The current connectivity state can be for example, "LTE access is disallowed" or "VoLTE is available" or "All Voice Call." The connectivity state may identify one or more wireless technologies the mobile station 13a is presently using for connection to a wireless network serviced by a wireless network provider. The connectivity state may be stored in the database and may also be associated with the tuning away characteristics noted above. For example, with reference to FIG. 2, the state derivation server 25 may determine from the connectivity characteristics that LTE access is disallowed based on information received from the mobile station 13a that indicates the mobile station 13a is tuning away from a LTE-Only mode to a CDMA mode. In another example, the state derivation server 25 may determine that only voice calls are allowed based on information received from the mobile station 13a that indicates that the mobile station 13a is tuning away from an single radio LTE (SRLTE) mode to a CDMA only mode.

The state derivation server 25 can then display the current connectivity state at a user interface 29 of a computing device 27 associated with the state derivation server 25. The state derivation server 25 may be a computing device remote from computing device 27. In addition to the current connectivity state, the one or more connectivity characteristics received from the mobile station 13a may also be displayed. In an example, when the particular RAT is LTE and the other RAT is CDMA, the state derivation server 25 may determine that Internet Protocol Media Sub-system (IMS) registration failed when the mobile station attempted to connect to the LTE RAT. The state derivation server 25 may also determine how long the IMS service has been unavailable to the mobile station 13a based on the duration for which the mobile station is tuning away. This example is purely illustrative and is not intended to limit the disclosed implementations.

In this way, as discussed above, the disclosed implementations can automatically derive an internal connectivity or operation state of a mobile station based on current connectivity characteristics of the mobile station. The disclosed implementations are advantageous because they may not need access to APIs that may be specific to modem or other device hardware of the mobile station. Furthermore, the disclosed implementations do not need movement of test equipment through a target market (such as a city or any region) to validate service availability. Instead, internal operational states of a device can be remotely and automatically derived to validate network coverage. This makes collecting and analyzing such data convenient for wireless network providers. Thus, wireless network providers are able to efficiently and effectively determine a complete overlay of wireless network technologies covering a geographic area.

In some implementations, the state derivation server 25 can receive one or more counts of connectivity to the one or more RATs that are serviced by the modem of the mobile station 13a. The counts may be numeric counts that can indicate a number of times the mobile station 13a connected to a particular wireless network. The counts can be stored in one or more memory counters at the mobile station 13a. In some aspects, the one or more counts of connectivity can be accumulated over a period of time at the mobile station 13a as the mobile station 13a operates in one or more geographic areas. The period of time may be a predetermined period of time or may vary based on geographic locations of the mobile device. For example, is the mobile station 13a is in a geographic region known to have less or no cell phone communication infrastructure, the period of time for which the connectivity counts are accumulated may be less. In some implementations, the counts of connectivity may be correlated to geographic locations on a digital map. The state derivation server 25 may then display the counts at the user interface 29 of the computing device 27 associated with the state derivation server 25. The user interface 29 may include a digital map that displays the counts at their respective geographic locations. The counts may be stored and further used by the state derivation server 25 to determine a coverage area of one or more RATs. The coverage area associated with respective RATs may then be displayed automatically on a digital map displayed at the user interface 29.

In some implementations, the state derivation server 25 can receive from the mobile station 13a one or more geographic locations of the mobile station 13a at a time when the modem of a mobile station 13a connected to an RAT. For example, the state derivation server may receive geographic co-ordinates from the mobile station 13a when the modem of the mobile station 13a connects to a legacy CDMA network from an existing connection to an enhanced LTE network. The state derivation server 25 may then display the one or more geographic locations on a digital map at the user interface 29 of the computing device 27. In some implementations, the one or more geographic locations can be estimated using one or more of: satellite global positioning satellite data, cellular network information, known Wi-Fi networks, Bluetooth networks or sensors on the mobile station. The state derivation server 25 may analyze the one or more geographic locations to determine a coverage footprint that overlays a network associated with the other RAT with another network associated with the particular RAT. For example, the state derivation service may connect on a digital map, the points of connectivity to a first RAT as well as a second RAT. The connected points would result in coverage regions associated with the respective first and second wireless technologies. Then, the state derivation server 25 may compute the overlapped region from the digital map to determine the coverage footprint. For example, the state derivation server 25 can determine a coverage footprint that overlays a network associated with a legacy CDMA RAT with another network associated with an enhanced LTE RAT. In some implementations, the state derivation server 25 can enable new services associated with the particular RAT (e.g., enhanced LTE RAT) for the mobile station 13a based on the determined coverage footprint.

In some implementations, the state derivation server 25 can automatically message one or more entities indicating a location of the mobile station 13a when the mobile station 13a is required to connect to the network using a RAT. For example, when the state derivation server 25 determines that the modem of the mobile station 13a has been required to connect to a legacy CDMA service from an enhanced LTE service, the state derivation server 25 can automatically message one or more entities (e.g., wireless network provider administrators). In this way, the administrators acquire real time awareness of device connectivity states determined by the state derivation server 25.

The data can be used to remotely determine internal operational states of a device and can be remotely and automatically derived to validate network coverage. This makes collecting and analyzing such data convenient for wireless network providers. Thus, wireless network providers are able to efficiently and effectively determine a complete overlay of wireless network technologies covering a geographic area. Furthermore in some implementations, the data may be automatically analyzed effect network changes. For example certain geographical regions may be switched to provide service based on legacy wireless technology (e.g. CDMA) and then back to an enhanced wireless service (e.g. LTE). Parameters associated with wireless data usage and network connectivity may be stored over time or recorded at a server or cloud-based database. The parameters may be retrieved at any time for further analysis and optimization of wireless networks serviced by a wireless network provider.

Network coverage data may be used to provide instructions to the mobile station 13a to control connectivity of the mobile station 13a. For example, the mobile station 13a may be automatically instructed to switch a connection from LTE to CDMA when LTE network coverage is known to be unavailable (or less available) in a particular geographic region associated with a current location of the mobile station 13a.

The enhanced device state derivation service under consideration here may be delivered to touch screen type mobile stations as well as to non-touch type mobile stations. Hence, our simple example shows the mobile station (MS) 13a as a non-touch type mobile station and shows the mobile station (MS) 13 as a touch screen type mobile station. Implementation of the on-line device state derivation service will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 3:
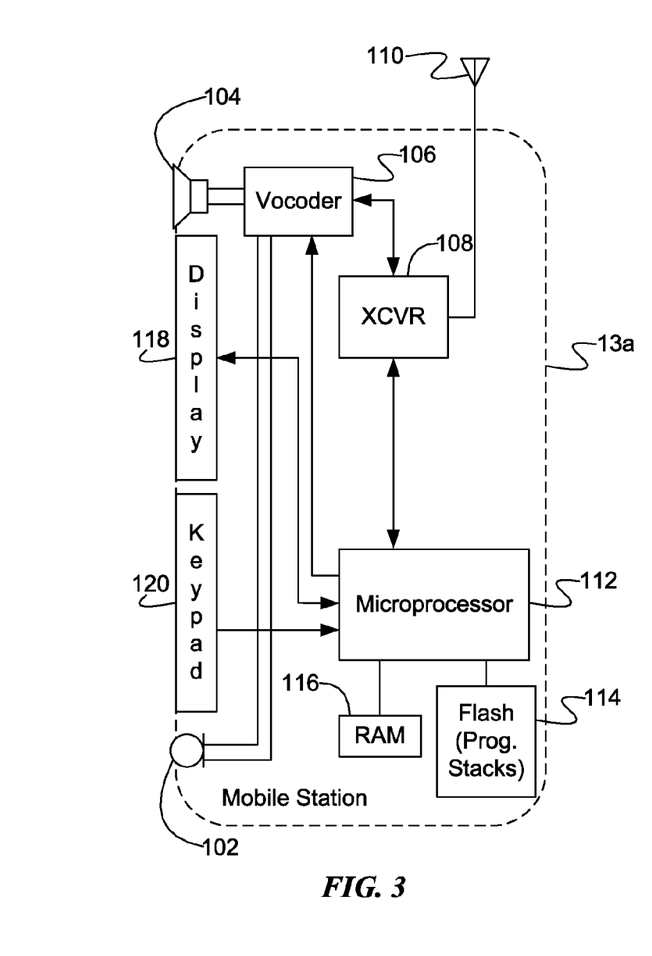
FIG. 3 is a high-level functional block diagram of an exemplary non-touch type mobile station as may utilize the device state derivation service through a network/system like that shown in FIG. 1.

For purposes of such a discussion, FIG. 3 provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including information related to the device state derivation service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during device state derivation.

A microprocessor 112 serves as a programmable controller for the mobile station 13a, in that it controls all operations of the mobile station 13a in accord with programming that it executes, for all normal operations, and for operations involved in the device state derivation procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing device state derivation.

Figure 4:
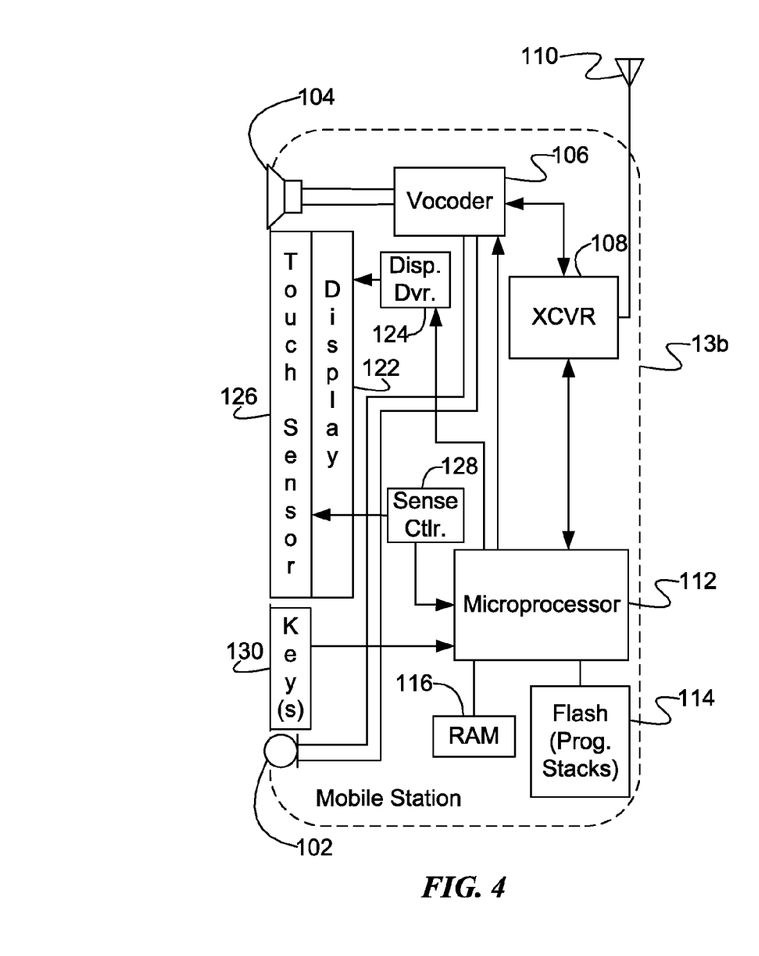
FIG. 4 is a high-level functional block diagram of an exemplary touch screen type mobile station as may utilize the device state derivation service through a network/system like that shown in FIG. 1.

For purposes of such a discussion, FIG. 4 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 4. For example, the touch screen type mobile station 13b includes a microphone 102, speaker 104 and vocoder 106, for audio input and output functions, much like in the earlier example. The mobile station 13b also includes a at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13*a*, a microprocessor 112 serves as a programmable controller for the mobile station 13*b*, in that it controls all operations of the mobile station 13*b* in accord with programming that it executes, for all normal operations, and for operations involved in the device state derivation procedure under consideration here. In the example, the mobile station 13*b* includes flash type program memory 114, for storage of various program routines and mobile configuration settings. The mobile station 13*b* may also include a non-volatile random access memory (RAM) 116 for a working data processing memory. Of course, other storage devices or configurations may be added to or substituted for those in the example. Hence, outlined above, the mobile station 13*b* includes a processor, and programming stored in the flash memory 114 configures the processor so that the mobile station is capable of performing various desired functions, including in this case the functions involved in the technique for providing device state derivation.

In the example of FIG. 4, the user interface elements included a display and a keypad. The mobile station 13*b* may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13*b* includes a display 122, which the microprocessor 112 controls via a display driver 124, to present visible outputs to the device user. The mobile station 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13*b*. The microphone 102 and speaker 104 may be used as additional user interface elements, for audio input and output, including with respect to some device state derivation related functions.

The structure and operation of the mobile stations 13*a* and 13*b*, as outlined above, were described to by way of example, only.

As shown by the above discussion, functions relating to device state derivation, via a graphical user interface of a mobile station may be implemented on computers connected for data communication via the components of a packet data network, operating as the state derivation server as shown in FIG. 1. Although special purpose devices may be used, such devices also may be implemented using one or more hardware platforms intended to represent a general class of data processing device commonly used to run "server" programming so as to implement the device state derivation functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for device state derivation. The software code is executable by the general-purpose computer that functions as the state derivation server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for device state derivation, in essentially the manner performed in the implementations discussed and illustrated herein.

Figures 5, 6:
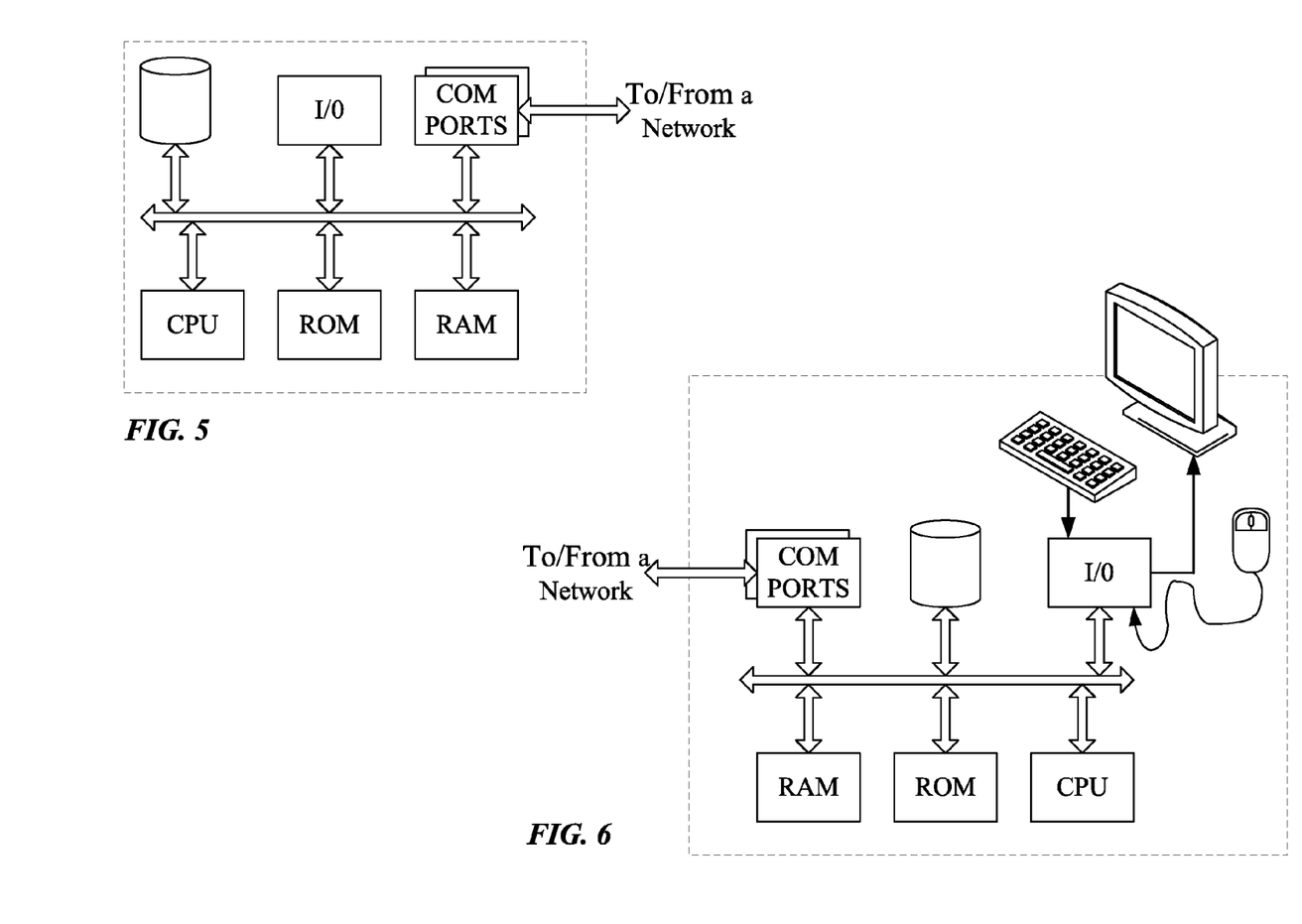
FIG. 5 is a simplified functional block diagram of a computer that may be configured as a host or server, for example, to function as the state derivation server in the system of FIG. 1.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of device state derivation outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider into the computer platform of the device state derivation service that will be the state derivation server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement device state derivation, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer implemented method comprising:
   collecting, by a state derivation server from a plurality of mobile stations remote from the state derivation server, current connectivity characteristics of the plurality of mobile stations with respect to one or more radio access technologies (RATs) that are supported by each of the plurality of mobile stations, the current connectivity characteristics including data representative of a particular type of network to which each mobile station in the plurality of mobile stations is currently connected;
   analyzing, by the state derivation server, the current connectivity characteristics of a mobile station in the plurality of mobile stations to determine whether the mobile station is tuning away from a particular RAT to access another RAT;
   determining, by the state derivation server based on the analyzing and based on the data representative of the particular type of network to which the mobile station is currently connected, a current connectivity state of the mobile station, the current connectivity state indicating at least one RAT of the one or more RATs that the mobile station is using to connect to a wireless network;
   receiving, by the state derivation server based on the determining of the current connectivity state, one or more geographic locations of the mobile station at one or more times when the current connectivity state indicates that the mobile station is connected to the wireless network using the other RAT; and
   displaying, at a user interface of a computing device associated with the state derivation server, the current connectivity state and the one or more geographic locations, the one or more geographic locations displayed at the user interface on a digital map.

2. The computer implemented method of claim 1, wherein the particular RAT is an enhanced RAT and the other RAT is a legacy RAT.

3. The computer implemented method of claim 1, wherein the particular RAT is Long Term Evolution (LTE) and the other RAT is Code Division Multiple Access (CDMA), the method further comprising:
   determining, by the state derivation server, that Internet Protocol Media Sub-system (IMS) registration failed when the mobile station attempted to connect to the LTE RAT;
   analyzing, by the state derivation server, the current connectivity characteristics of the mobile station with respect to the one or more RATs to determine a duration for which the mobile station is tuning away from the particular RAT to access the other RAT; and
   determining, by the state derivation server, how long IMS service has been unavailable to the mobile station based on the duration for which the mobile station is tuning away.

4. The computer implemented method of claim 1, further comprising:
   receiving, by the state derivation server, one or more counts of connectivity to the one or more RATs that are supported by the mobile station, wherein the counts are stored in one or more memory counters at the mobile station.

5. The computer implemented method of claim 4, wherein the one or more counts of connectivity are accumulated over a period of time as the mobile station operates in one or more geographic areas.

6. The computer implemented method of claim 1, further comprising analyzing, by the state derivation server, the one or more geographic locations to determine a coverage footprint that overlays a network associated with the other RAT with another network associated with the particular RAT, wherein the particular RAT is an enhanced RAT and the other RAT is a legacy RAT.

7. The computer implemented method of claim 1, wherein the one or more geographic locations are estimated using one or more of: satellite global positioning satellite data, cellular network information, known Wi-Fi networks, Bluetooth networks or sensors on the mobile station.

8. The computer implemented method of claim 6, further comprising enabling, by the state derivation server, new services associated with the particular RAT for the mobile station based on the determined coverage footprint.

9. The computer implemented method of claim 8, further comprising:
   automatically messaging, by the state derivation server, one or more entities indicating a location of the mobile station when the mobile station is required to connect to the network associated with the other RAT.

10. A state derivation server comprising:
    a communication interface configured to enable communication via a mobile network;
    a physical processor coupled with the communication interface;
    a storage device accessible to the processor; and
    an executable program in the storage device, wherein execution of the program by the processor configures the server to perform functions, including functions to:
    collect, from a plurality of mobile stations remote from the state derivation server, current connectivity characteristics of the plurality of mobile stations with respect to one or more radio access technologies (RATs) that are supported by each of the mobile stations, the current connectivity characteristics including data representative of a particular type of network to which each mobile station in the plurality of mobile stations is currently connected;
    analyze the current connectivity characteristics of a mobile station in the plurality of mobile stations to determine whether the mobile station is tuning away from a particular RAT to access another RAT;
    determine, based on the analysis and based on the data representative of the particular type of network to which the mobile station is currently connected, a current connectivity state of the mobile station, the current connectivity state indicating at least one RAT of the one or more RATs that the mobile station is using to connect to a wireless network;
    receive, based on the determination of the current connectivity state, one or more geographic locations of the mobile station at one or more times when the current connectivity state indicates that the mobile station is connected to the wireless network using the other RAT; and
    display, at a user interface of a computing device associated with the state derivation server, the current connectivity state and the one or more geographic locations, the one or more geographic locations displayed at the user interface on a digital map.

11. The state derivation server of claim 10, wherein the particular RAT is an enhanced RAT and the other RAT is a legacy RAT.

12. The state derivation server of claim 10, wherein execution of the program by the processor configures the state derivation server to perform functions, including functions to:
  determine that Internet Protocol Media Sub-system (IMS) registration failed when the mobile station attempted to connect to a LTE RAT;
  analyze the current connectivity characteristics of the mobile station with respect to the one or more RATs to determine a duration for which the mobile station is tuning away from the particular RAT to access the other RAT; and
  determine how long IMS service has been unavailable to the mobile station based on the duration for which the mobile station is tuning away.

13. The state derivation server of claim 10, wherein execution of the program by the processor configures the state derivation server to perform functions, including functions to:
  receive one or more counts of connectivity to the one or more RATs that are supported by the mobile station, wherein the counts are stored in one or more memory counters at the mobile station.

14. The state derivation server of claim 13, wherein the one or more counts of connectivity are accumulated over a period of time as the mobile station operates in one or more geographic areas.

15. The state derivation server of claim 10, wherein execution of the program by the processor configures the state derivation server to perform functions, including functions to analyze the one or more geographic locations to determine a coverage footprint that overlays a network associated with the other RAT with another network associated with the particular RAT, wherein the particular RAT is an enhanced RAT and the other RAT is a legacy RAT.

16. The state derivation server of claim 10, wherein one or more geographic locations are estimated by the mobile station using one or more of: satellite global positioning satellite data, cellular network information, known Wi-Fi networks, Bluetooth networks or sensors on the mobile station.

17. The state derivation server of claim 15, wherein execution of the program by the processor configures the state derivation server to perform functions, including functions to enable new services associated with the particular RAT for the mobile station based on the determined coverage footprint.

18. The state derivation server of claim 17, wherein execution of the program by the processor configures the state derivation server to perform functions, including functions to:
  automatically message one or more entities indicating a location of the mobile station when the mobile station is required to connect to the network associated with the other RAT.

19. A non-transitory computer-readable medium comprising instructions which, when executed by one or more computers, cause the one or more computers to:
  collect, at a state derivation server from a plurality of mobile stations remote from the state derivation server, current connectivity characteristics of the plurality of mobile stations with respect to one or more radio access technologies (RATs) that are supported by each of the plurality of mobile stations, the current connectivity characteristics including data representative of a particular type of network to which each mobile station in the plurality of mobile stations is currently connected;
  analyze, at the state derivation server, the current connectivity characteristics of a mobile station in the plurality of mobile stations to determine whether the mobile station is tuning away from a particular RAT to access another RAT;
  determine, at the state derivation server based on the analysis and based on the data representative of the particular type of network to which the mobile station is currently connected, a current connectivity state of the mobile station, the current connectivity state indicating at least one RAT of the one or more RATs that the mobile station is using to connect to a wireless network;
  receive, at the state derivations server based on the determination of the current connectivity state, one or more geographic locations of the mobile station at one or more times when the current connectivity state indicates that the mobile station is connected to the wireless network using the other RAT; and
  display, at a user interface of a computing device associated with the state derivation server, the current connectivity state and the one or more geographic locations, the one or more geographic locations displayed at the user interface on a digital map.

20. The non-transitory computer-readable medium of claim 19, wherein the particular RAT is an enhanced RAT and the other RAT is a legacy RAT.

* * * * *